March 16, 1948.  R. E. RAMBO ET AL  2,438,020
GEAR HOUSING
Filed Oct. 25, 1944
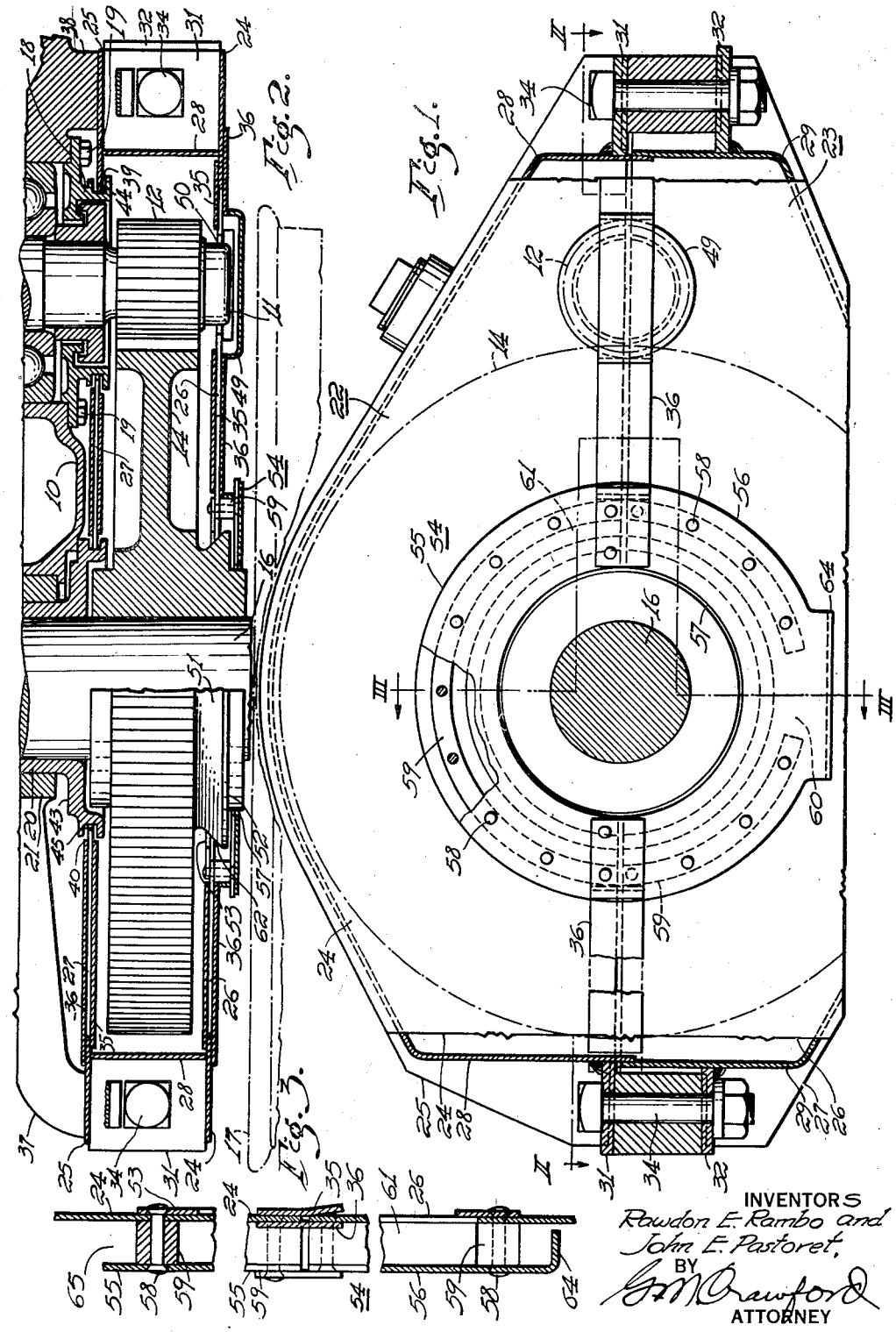
INVENTORS
Rawdon E. Rambo and
John E. Pastoret,
BY
G. M. Crawford
ATTORNEY Patented Mar. 16, 1948

2,438,020

UNITED STATES PATENT OFFICE 2,438,020

GEAR HOUSING

Rawdon E. Rambo and John E. Pastoret, Wilkinsburg, Pa., assignors to Westinghouse Electric Corporation, East Pittsburgh, Pa., a corporation of Pennsylvania Application October 25, 1944, Serial No. 560,303

8 Claims. (Cl. 74—606)

1

Our invention relates, generally, to gear housings and it has reference, in particular, to water-tight gear housings for mining locomotive drives.

Generally stated, it is an object of our invention to provide a water-tight housing for the driving gears of a mining locomotive which is simple and inexpensive to manufacture and economical to maintain.

More specifically, it is an object of our invention to provide for so arranging a locomotive drive housing relative to the motor housing and axle bearing as to provide an effective seal against the entrance of mine water.

It is also an object of our invention to provide a simple and effective running seal between a housing and the vehicle axle so as to exclude mine water from the housing.

Yet another object of our invention is to provide an effective seal for a mining locomotive gear housing against mine water, in a limited space between the gear and the vehicle wheel.

Still another object of our invention is to provide a running seal between a mining locomotive gear housing and the vehicle axle which is highly effective in excluding abrasive mixtures of iron ore and water from the housing.

Another object of our invention is to provide for adapting existing designs of mining locomotive drives to furnish an effective seal against mine water with a minimum of alterations.

A further object of our invention is to provide a simple and effective stationary seal between the gear housing and the axle bearing and motor cap which may be readily opened for inspection and for other purposes.

Other objects will, in part, be obvious, and will, in part, be explained hereinafter.

In accordance with our invention, a simple and effective water-tight gear housing is provided for a mine locomotive by using a tongue and groove fit between the motor side of the housing, and the pinion bearing cap and axle bearing. On the wheel side of the housing, a running seal is provided between the side of the housing and the gear hub by machining baffle and thrower surfaces on the gear hub and securing a split shield about the axle in spaced relation on the side of the housing so as to form with the side of the housing a splash chamber and a drain trough.

For a more complete understanding of the nature and objects of our invention, reference may be made to the following detailed description which may be studied in connection with the accompanying drawing, in which:

Figure 1 is a side elevational view, broken out

2 in part, of a gear housing embodying the invention in one of its forms;

Fig. 2 is a sectional view taken along line II—II of Fig. 1; and

Fig. 3 is an enlarged sectional view, taken along the line III—III of Fig. 1, showing details of the splash shield.

Referring to Figures 1 and 2, the reference numeral 10 may denote a portion of the pinion end housing connected to the frame of a motor (not shown) for driving a mining locomotive or the like, and which may be provided with a drive shaft 11 having a pinion 12 thereon for engaging a gear 14 which is disposed to drive the axle 16 of the vehicle on which a wheel 17 may be mounted, the flange of which is shown in dotted outline. A pinion end bearing cap 18 may be positioned about the shaft 11 and secured to the frame by bolts 19. The axle 16 may be secured in predetermined relation to the motor frame 10 by means of a bearing 20 which is shown in part and may be secured to the motor frame by means of a bearing cap 21, also shown only in part.

For enclosing the gear and pinion, a gear housing may be provided, comprising upper and lower sections 22 and 23 having upper side sheets 24, 25 and lower side sheets 26, 27 on the wheel and motor sides thereof, respectively. The side sheets of the upper section and the lower section may be maintained in the proper spaced relation to each other by means of upper and lower strips 28 and 29 which may be welded or secured in any other suitable manner to their corresponding side sheet sections. The upper and lower sections of the housing may be secured together in any suitable manner, such as by means of lugs 31 and 32 secured to the upper and lower sections adjacent the ends and having openings therein for receiving means such as the bolts 34. These bolts may also be used to secure the housing relative to the motor by means of supports such as the arms 37 and 38 on the axle bearing cap and pinion and housing, respectively.

A substantially water-tight connection may be provided between the upper and lower sections by means of inner and outer sealing strips 35 and 36 positioned along the adjacent edges of the sections. The strips may, for example, be secured to the upper section, as shown in Fig. 3, having for example the lower edge of the inner strip bent inwardly so as to provide a tapered groove for readily receiving the upper edge of the lower section of the casing.

In order to provide a water-tight seal between the housing, and the motor shaft and vehicle axle on the motor side of the housing, peripheral grooves 39 and 40 may be provided in substantially the same vertical plane about the peripheries of the pinion bearing cap 18 and the flange 43 of the bearing 20. Openings 44 and 45 may be provided in the motor side of the housing side sheets along the line of junction therebetween to receive the outer portions of the bearing cap 18 and the bearing flange 43, and so arranged that the edges of the sheets about the openings will be positioned in the peripheral grooves. A seal may be provided with the stationary surfaces by means of a suitable sealing compound positioned in the grooves.

On the wheel side of the housing, a cap 49 may be provided for sealing the pinion shaft opening 50. In order to provide a substantially watertight seal with the vehicle axle in the limited space between the outer side sheet of the housing and the vehicle wheel 17 which is shown in dotted outline, the hub of the gear 14 may be machined to provide a reduced section 51 adjacent a substantially radial shoulder portion 52 which projects through an opening 53 in the side of the housing and acts as a baffle against the entrance of water in conjunction with a shield 54 secured to the outer side sheet of the housing.

The shield 54 may comprise substantially a split ring of a relatively soft sheet metal, such as brass or the like, having upper and lower ring sections 55 and 56 which may be secured to the side sheets 24 and 26, respectively, to define a circular opening 57 which provides a relatively small clearance of about 1/16 inch about the reduced section 51 of the gear hub. The sections of the shield may, for example, be secured to the side sheet sections by means of rivets 58 and maintained in predetermined spaced relation thereto, so as to be positioned in relatively close spaced relation to the baffle surface 52 on the wheel side thereof, by means of a split ring spacer 59 which may be split along the center line of the housing. An opening 60 may be provided in the lower side for draining out any water which might accumulate in the splash chamber 61 between the shield and the side sheet 26.

For the purpose of further preventing the entrance of any moisture into the housing through the axle opening, the hub of the gear 14 may be machined to provide an inclined thrower surface 62 adjacent the baffle surface 52 so as to throw any moisture leaking past the baffle surface back into the splash chamber 61 between the shield 54 and the side sheet of the housing so that it may drain out through the opening 60. The shield 54 may be provided with an inturned portion 64 along the lower edge to prevent any moisture being splashed into the opening 60 in the spacer by the wheel of the vehicle. Since the shield 54 projects beyond the spacer 59, it forms therewith and with the side wall of the housing a trough 65 which catches any water etc. which is splashed against or runs down the side of the housing about the axle, and directs it away from the opening 57.

By providing an inclined thrower surface 62, the bore of the opening 53 need be no greater than the diameter of the gear hub at the outer edge of the radial shoulder 52, since the side wall of the housing is positioned inside the radial shoulder and over the inclined thrower surface where sufficient operating clearance is permitted. The splash shield may be positioned quite close to the radial shoulder no more than 1/4" being necessary, so that the whole splash chamber may be positioned within the length of the gear hub, and clear of the wheel flange 17.

From the above description and the accompanying drawing, it will be apparent that we have provided in a simple and effective manner for sealing the gear housing of a mining locomotive or the like against the entrance of mine water which usually contains abrasive ore particles and is extremely harmful to the gears. By means of our invention, standard designs of gear housings may be readily adapted for use in moist locations such as in mines at a minimum of labor and expense. A simple and effective stationary seal is provided between the housing and the pinion bearing cap and axle bearing which may be easily broken when removing the housing for purposes of repair or inspection. The running seal between the gear and the housing requires only a minimum of close tolerances and may be readily machined and assembled at little expense.

Since certain changes may be made in the above-described construction and different embodiments of the invention may be made without departing from the spirit and scope thereof, it is intended that all the matter contained in the above description and shown in the accompanying drawing shall be construed as illustrative and not in a limiting sense.

We claim as our invention:

1. The combination with a motor having a shaft with a pinion thereon for driving a gear, of a stationary end cap positioned about the shaft between the pinion and the motor and having a peripheral groove, and a housing for the gear and pinion comprising opposed sections separable along a line through the shaft and having an opening on the motor side to receive a portion of the end cap with the edges thereof positionable in the peripheral groove.

2. A motor drive for a vehicle comprising, a motor having a frame with a pinion housing associated therewith and having a drive shaft with a pinion thereon extending from the housing, a cap positioned about the shaft between the pinion housing and pinion and secured to the pinion housing, said cap having a peripheral groove spaced from the housing, an axle having a gear thereon meshing with the pinion, an axle bearing positioned in fixed relation relative to the frame and having a peripheral groove in substantially the same plane as the groove in the cap, and a housing for the gear and pinion having separable sections with side walls positionable about the bearing and cap and projecting into the grooves thereof.

3. In a vehicle drive, a motor having a frame with a pinion housing having a shaft extending therefrom with a pinion thereon, an axle having a gear in driving relation with the pinion, a bearing cap secured to the pinion housing having a portion with a peripheral groove positioned about the shaft between the housing and the pinion, means securing the axle relative to the motor frame including a bearing having a portion adjacent the gear with a peripheral groove in substantially the plane of the groove in the bearing cap, and a sheet metal housing having upper and lower sections with side walls meeting along a line between the axes of the motor shaft and the axle and extending into the grooves in the bearing cap and the axle bearing.

4. In a gear drive for a vehicle having an axle, a motor having a frame and a shaft with a pinion, a bearing for the axle secured to the motor frame and having a peripheral groove adjacent the outer end, a stationary bearing cap supported by the motor frame about the shaft between the frame and the pinion and having a peripheral groove, a gear on the axle in driving relation with the pinion and having a plurality of stepped shoulder portions on the outer portion of the hub forming a baffle and a thrower, a housing having separable upper and lower sections with inner side walls joining along a line between the axle and shaft and projecting into the grooves of the bearing cap and axle bearing, and outer side walls having openings to receive the thrower portions of the gear hub, and corresponding shield portions positioned outside the baffle portions secured in spaced relation to the outer side wall.

5. In a rotating seal between a gear housing and a gear, a hub portion on the gear having adjacent baffle and thrower peripheral portions, a side wall of the housing positioned between the thrower and the gear and split along a line through the axis of the gear, said side wall having alined semicircular openings in adjacent edge portions forming an opening about the hub, a shield positioned outside the housing and beyond the baffle and having an opening with the edges extending inwardly beyond the outer edge of the baffle, and means positioning the shield in spaced relation to the side wall on the outside thereof so as to define therewith a peripheral trough outside the housing and open on the bottom.

6. A rotating seal comprising, a rotatable hub having adjacent baffle and thrower surfaces, a sheet metal housing having a side wall positioned inside the thrower surface and comprising two sections joined along a line through the axis of the hub with adjoining edges recessed to form an opening for the hub, a shield positioned outside the baffle surface and the housing side wall and comprising two sections jointed along a line through the axis of the hub, and means securing the shield to the housing including a ring-like spacer positioned between the shield and the housing, said spacer having a drain opening on the bottom and defining with the shield a drain trough outside the housing.

7. In a gear drive for a mining locomotive having an axle disposed to be driven by a motor having a frame and a shaft with a pinion thereon, a bearing cap secured to the motor frame on the pinion end having a peripheral groove therein, a bearing for the axle secured to the motor frame and having a peripheral groove therein in substantially the plane of the groove in the motor cap, a gear mounted on the axle in driving relation with the pinion and having adjacent peripheral baffle and thrower surfaces on the outer side thereof, a housing for the gear and pinion having upper and lower sections joined along a line between the axle bearing and bearing cap with the inner walls fitting in said grooves and the outer wall positioned within the thrower and the baffle, and a splash shield comprising upper and lower semi-ring sections positioned outside the baffle, the lower section having an inturned edge portion, and means securing the splash shield sections in spaced relation to the outer wall.

8. In a housing for a pinion mounted on a motor drive shaft and a gear mounted on a vehicle axle having a bearing secured in fixed relation to the motor, a bearing cap secured about the motor shaft and secured to the motor, and a housing having inner and outer walls each comprising upper and lower sections joined along a line between the motor shaft and axle with the inner wall fitting about the bearing cap and axle bearing and the outer wall having a two piece splash shield positioned about the axle and secured in spaced relation to the side wall by a sectional ring-like spacer substantially enclosing the space between the shield and the side wall.

RAWDON E. RAMBO.
JOHN E. PASTORET.

REFERENCES CITED

The following references are of record in the file of this patent:

UNITED STATES PATENTS

| Number | Name | Date |
|---|---|---|
| 776,669 | Mattice | Dec. 6, 1904 |
| 961,085 | Lieber | June 7, 1910 |
| 1,594,838 | Kegresse | Aug. 3, 1926 |
| 1,640,463 | McFarland | Aug. 30, 1927 |
| 1,861,941 | Short | June 7, 1932 |
| 2,108,724 | Nemetz | Feb. 15, 1938 |
| 2,125,456 | McWhirter | Aug. 2, 1938 |